(12) United States Patent
Lee et al.

(10) Patent No.: US 8,587,409 B2
(45) Date of Patent: Nov. 19, 2013

(54) RADIO SECURITY LEADER CONTROLLING OPERATION MODE, AND RADIO SECURITY TAG SUPPORTING SECURITY MODE AND NORMAL MODE

(75) Inventors: Sang Yeoun Lee, Daejeon (KR); Heyung Sub Lee, Daejeon (KR); You Sung Kang, Daejeon (KR); Kang Bok Lee, Daejeon (KR); Su Na Choi, Daejeon (KR); Hyun Seok Kim, Daejeon (KR); Dong Beom Shin, Daejeon (KR); Doo Ho Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 303 days.

(21) Appl. No.: 13/042,263

(22) Filed: Mar. 7, 2011

(65) Prior Publication Data

US 2011/0215908 A1    Sep. 8, 2011

(30) Foreign Application Priority Data

Mar. 8, 2010 (KR) .......................... 10-2010-0020290
Feb. 22, 2011 (KR) .......................... 10-2011-0015383

(51) Int. Cl.
*H04Q 5/22* (2006.01)

(52) U.S. Cl.
USPC .............................. 340/10.1; 340/5.1; 713/168

(58) Field of Classification Search
USPC ..................... 340/10.1, 5.1, 572.9; 713/168
See application file for complete search history.

(56) References Cited

U.S. PATENT DOCUMENTS

| 8,198,985 B2* | 6/2012 | Tiernay et al. ............. 340/10.51 |
| 2007/0069852 A1* | 3/2007 | Mo et al. .......................... 340/5.1 |
| 2008/0204199 A1* | 8/2008 | Howarth et al. ............. 340/10.1 |

FOREIGN PATENT DOCUMENTS

| JP | 4423206 | 2/2006 |
| KR | 1020070034425 | 3/2007 |
| KR | 1020080050918 | 6/2008 |
| KR | 1020100064292 | 6/2010 |

* cited by examiner

*Primary Examiner* — Daniel Wu
*Assistant Examiner* — Benyam Haile
(74) *Attorney, Agent, or Firm* — Nelson Mullins Riley & Scarborough LLP

(57) ABSTRACT

Disclosed are a radio secure reader and a radio secure tag for supporting a secure mode and a normal mode. The radio secure reader for controlling an operation mode of the radio secure tag may include a reader modem to receive the operation mode from the radio secure tag, and a reader processing unit to identify the received operation mode as a normal mode or a secure mode, and to control the radio secure tag based on the identified operation mode.

6 Claims, 6 Drawing Sheets

FIG. 5

· Toggle_Mode Command

| Command (0xE100) | Mode | Handle | CRC16 |

· Toggle_Mode Reply

| Header | Handle | CRC16 |

· Get_SecParam Command

| Command (0xE1XX) | Handle | CRC16 |

· Get_SecParam Reply

| Header | SecParam | KI | Handle | CRC16 |

· Sec_ACK Command

| Command (0xE1XX) | Seed(1) | Handle | CRC16 |

· Sec_ACK Reply

| SecParam | KI | Seed(2) | Handle | CRC16 |

· Sec_ReqRN Command

| Command (0xE1XX) | CH_int | Handle | CRC16 |

· Sec_ReqRN Reply

| CH_int | Handle | CRC16 |

· TagAuth Command

| Command (0xE1XX) | CH_int | Handle | CRC16 |

· TagAuth Reply

| Header | Auth_Data | Handle | CRC16 |

· ReaderAuth Command

| Command (0xE1XX) | Handle | CRC16 |

· ReaderAuth Reply

| CH_tag | Handle | CRC16 |

· Get_ReaderAuth Command

| Command (0xE1XX) | CH_tag | CH_int | Handle | CRC16 |

· Get_ReaderAuth Reply

| CH_int | Handle | CRC16 |

# RADIO SECURITY LEADER CONTROLLING OPERATION MODE, AND RADIO SECURITY TAG SUPPORTING SECURITY MODE AND NORMAL MODE

TECHNICAL FIELD

Embodiments of the present invention relate to a radio secure tag for supporting both a secure mode and a normal mode, and more particularly, to a system for selectively operating the radio secure tag in one of a secure mode and a normal mode based on an active set of a radio secure reader.

BACKGROUND ART

A Radio Frequency Identification (RFID) apparatus may be employed for a variety of fields, for example, management of goods. The RFID apparatus may perform communication according to an International Organization for Standardization (ISO)/International Electrotechnical Commission (IEC) 18000-6 protocol. The RFID apparatus may require a secure function due to a probability of copy and data loss.

In this instance, an RFID tag may need technology that may support a variety of modes, for example, a secure mode and a normal mode and provide a compatibility with a secure RFID reader supporting a secure function and a general RFID reader not supporting the secure function, thereby enabling the RFID tag to be applicable in further various fields.

DISCLOSURE OF INVENTION

Technical Goals

An aspect of the present invention is to support a compatibility with a secure reader supporting a secure function and a general reader not supporting the secure function by operating a radio secure tag in one of a secure mode and a normal mode.

Technical solutions

According to an aspect of the present invention, there is provided a radio secure reader for controlling an operation mode of a radio secure tag, including: a reader modem to receive the operation mode from the radio secure tag; and a reader processing unit to identify the received operation mode as a normal mode or a secure mode, and to control the radio secure tag based on the identified operation mode.

According to another aspect of the present invention, there is provided a radio secure tag for supporting a secure mode and a normal mode, including: a tag modem to transmit a predetermined operation mode to a radio secure reader in response to an access request from the radio secure reader; and a tag processing unit to perform authentication processing according to processing in the radio secure reader based on the operation mode, and to operate according to control of the authenticated radio secure reader when the radio secure reader is authenticated.

EFFECT OF THE INVENTION

According to embodiments of the present invention, it is possible to support a compatibility with a secure reader supporting a secure function and a general reader not supporting the secure function by operating a radio secure tag in one of a secure mode and a normal mode.

BRIEF DESCRIPTION OF DRAWINGS

FIG. 5 is a diagram illustrating a secure command format between a radio secure tag operating in a secure mode and a secure reader according to an embodiment of the present invention.

BEST MODE FOR CARRYING OUT THE INVENTION

Figure 1:
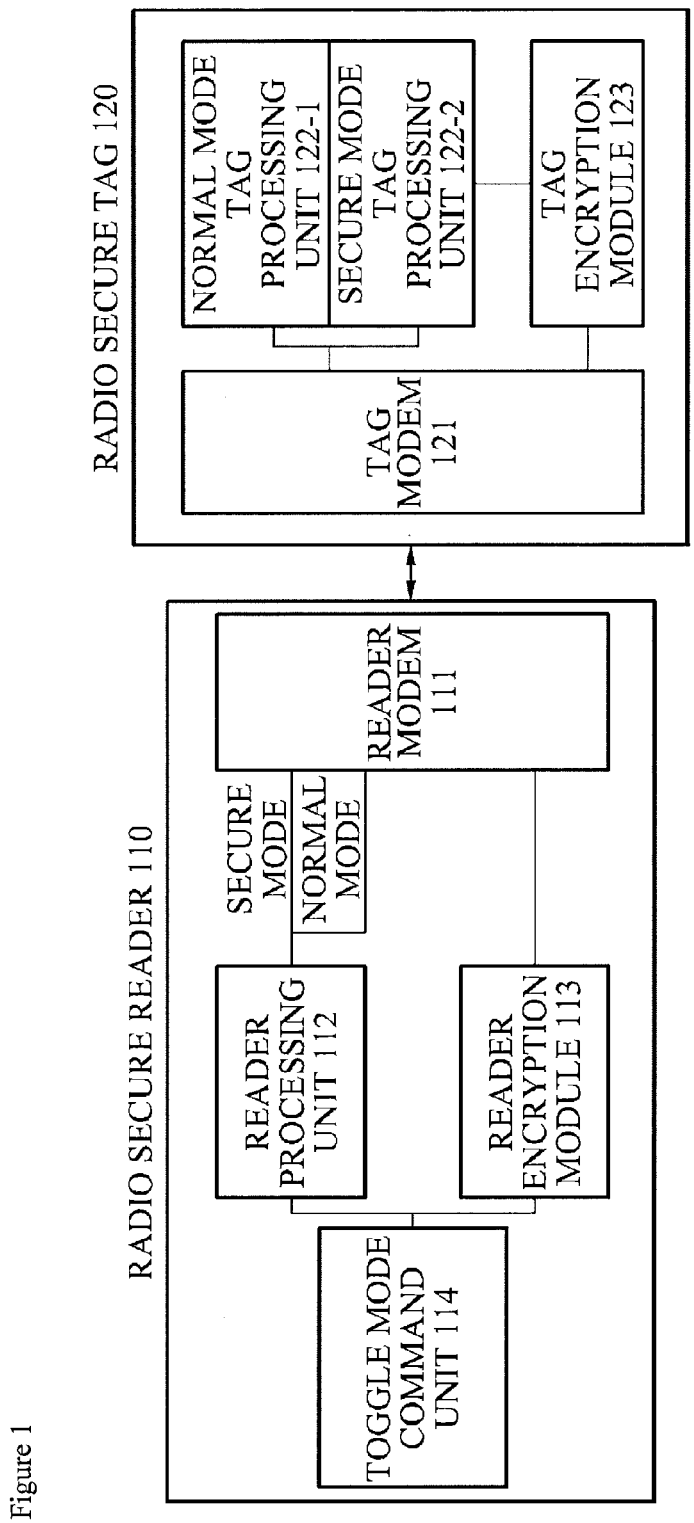
FIG. 1 is a block diagram illustrating a configuration of a Radio Frequency Identification (RFD) system including a radio secure reader and a radio secure tag supporting a secure mode and a normal mode according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, a radio secure reader and a radio secure tag supporting a secure mode and a normal mode according to embodiments of the present invention will be described with reference to the accompanying drawings. In the present specification, the radio secure tag may be, for example, a Radio Frequency Identification (RFID) tag. Also, in the radio secure tag, the secure mode may correspond to a secure function and thus, may be a mode for supporting a data encryption communication and the normal mode may be a mode for supporting a communication according to an International Organization for Standardization (ISO)/International Electrotechnical Commission (WC) 18000-6 protocol.

FIG. 1 is a block diagram illustrating a configuration of an RFID system including a radio secure reader 110 and a radio secure tag 120 supporting a secure mode and a normal mode according to an embodiment of the present invention.

For ease of description, hereinafter, the radio secure reader 110 and the radio secure tag 120 will be separately described with reference to FIG. 1.

On a left side of FIG. 1, the radio secure reader 110 controlling an operation mode of the radio secure tag 120 is shown. The radio secure reader 110 may include a reader modem 111, a reader processing unit 112, a toggle mode command unit 113, and a reader encryption module 113.

The reader modem 111 functions to receive, from the radio secure tag 120, an operation mode that is predetermined and is stored in the radio secure tag 120.

The reader processing unit 112 functions to identify the received operation mode as a normal mode or a secure mode.

When the operation mode is identified as the normal mode, the reader processing unit 112 may perform a first inventory process and an additional authentication processing process for control of the radio secure tag 120, for example, change of the operation mode. That is, the additional authentication processing process may be a separate authentication processing process for mutual authentication between the radio secure reader 110 and the radio secure tag 120.

When the operation mode is identified as the secure mode, the reader processing unit 112 may perform a second inventory process including the authentication processing process. That is, in the secure mode, the reader processing unit 112 may complete a mutual authentication procedure between the radio secure reader 110 and the radio secure tag 120 by performing only the inventory process without generating a separate command and thereby enables rapid control with respect to the radio secure tag 120.

The reader processing unit 112 may provide a control environment with respect to the radio secure tag 120 by identifying the operation mode as the normal mode or the secure mode, and by selectively performing the first inventory process or the second inventory process that are classified for each identified mode.

When the mutual authentication between the radio secure reader 110 and the radio secure tag 120 is completed through the authentication processing differently performed for each mode, the toggle mode command unit 114 may perform processing for changing a mode stored in the radio secure tag 120. That is, when the first inventory process and the additional authentication processing process are completed or the second inventory process alone is completed by the reader processing unit 112 whereby authentication with respect to the radio secure reader 110 is completed, the toggle mode command unit 114 may change the operation mode of the radio secure tag 120 or change data stored in the radio secure tag 120.

According to another embodiment of the present invention, the toggle mode command unit 114 may determine the operation mode of the radio secure tag 120 in an initial state where the operation mode is not determined, and transmit the determined operation mode to the radio secure tag 120 via the reader modem 111, thereby controlling the determined operation mode to be stored in the radio secure tag 120.

Specifically, with respect to the radio secure tag 120 supporting both the secure mode and the normal mode, the toggle mode command unit 114 may control the radio secure tag 120 by operating the radio secure tag 120 in only a single mode, for example, the secure mode or the normal mode based on an environment.

Hereinafter, an operation of the reader processing unit 112 for each mode will be further described.

When the operation mode from the radio secure tag 120 is received as the normal mode, the reader processing unit 112 may perform the first inventory process, thereby enabling communication with the radio secure tag 120 in a state where a minimal security is maintained. That is, the reader processing unit 112 may perform a process from a ready state to an open state.

Next, when a change of the operation mode with respect to the radio secure tag 120 is required, the reader processing unit 112 may complete the authentication of the radio secure reader 110 by additionally performing the separate authentication processing process. That is, the reader processing unit 112 may perform a process from the open state to an Auth state.

When the operation mode is identified as the normal mode, the reader processing unit 112 may perform the first inventory process and then, perform the authentication processing with respect to the radio secure reader 110 as necessary. When the radio secure reader 110 is authenticated, the reader processing unit 112 may allow a further extended right with respect to a secure communication with the radio secure tag 120, for example, update of an encryption key, change of the operation mode, and the like.

As the additional authentication processing in the normal mode performed after the first inventory process, the reader processing unit 112 may receive a first challenge_tag (CH_tag) message from the radio secure tag 120 and may transmit, to the radio secure tag 120, a first challenge_int (CH_int) message together with a second CH_tag message in which the first CH_tag message is encrypted. Next, the reader processing unit 112 may receive, from the radio secure tag 120, a second CH_int message associated with the first CH_int message. When the first CH_int message matches the second CH_int message, the reader processing unit 112 may authenticate the radio secure tag 120.

In this instance, the reader processing unit 112 may drive the reader encryption module 113 using a first secret key to decrypt the second CH_int message received from the radio secure tag 120 and then compare the first CH_int message with the second CH_int message. Here, the reader processing unit 112 may receive, from the radio secure tag 120, key related information, for example, a key index associated with a second secret key and extract the first secret key from a database (not shown) storing a plurality of secret keys based on the key related information. Through this, the reader processing unit 112 may drive the reader encryption module 113 using the same first secret key as the second secret key used in the radio secure tag 120. In the normal mode, the reader encryption module 113 may be used for authentication processing with respect to the radio secure tag 120 after the first inventory process is completed.

When the operation mode is identified as the secure mode, that is, when rapid control with respect to the radio secure tag 120 is required, the reader processing unit 112 may rapidly perform the second inventory process including the authentication processing with respect to mutual authentication between the radio secure reader 110 and the radio secure tag 120 and then allow the control with respect to the radio secure reader 110. That is, the reader processing unit 112 may perform only "void ACK", "Sec_ACK", and "Auth" of FIG. 6

Specifically, in the secure mode, the reader processing unit 112 may perform the second inventory process including the authentication processing and thereby may rapidly control the radio secure tag 120 without performing separate authentication processing such as in the normal mode.

As the authentication processing included in the second inventory process, the reader processing unit 112 may receive a first random number RN16 from the radio secure tag 120 and transmit, to the radio secure tag 120, the first CH_int message together with a second random number in which the first random number is encrypted. Next, the reader processing unit 112 may receive, from the radio secure tag 120, the second CH_int message associated with the first CH_int message. When the first CH_int message matches the second CH_int message as a comparison result, the reader processing unit 112 may authenticate the radio secure tag 120.

As the second inventory process performed when the received operation mode is the secure mode, the reader processing unit 112 may transmit secure_Acknowledgment (Sec_ACK) command to the radio secure tag 120, may receive information associated with a security from the radio secure tag 120 as a response to the Sec_ACK command, and may initialize the reader encryption module 113 based on information associated with the security. After initializing the reader encryption module 113, the reader processing unit 112 may transmit an ACK command to the radio secure tag 120, may receive Electric Product Code (EPC) information from the radio secure tag 120 as a response to the ACK command, and may decrypt the EPC information using the initialized reader encryption module 113.

The reader processing unit 112 may drive the reader encryption module 113 using the first secret key to decrypt the second CH_int message received from the radio secure tag 120, and may compare the first CH_int message with the second CH_int message. In the secure mode, the reader encryption module 113 may be continuously driven while the second inventory process is being performed.

As an example of controlling the operation mode, when the received operation mode is the normal mode, the toggle mode command unit 114 may receive, from a user, a command to maintain the normal mode or a command to shift from the normal mode to the secure mode, and may transmit the received command to the radio secure tag 120.

When the received operation mode is the secure mode, the toggle mode command unit 114 may receive, from the user, a command to maintain the secure mode or a command to shift from the secure mode to the normal mode, and may transmit the received command to the radio secure tag 120.

The reader encryption module 113 may be driven by the toggle mode command unit 114 to encrypt a message, for example, a CH_int message that is transmitted to the radio secure tag 120 or to decrypt a message received from the radio secure tag 120. In this instance, the reader encryption module 113 may be driven using the first secret key stored in the database.

On a right side of FIG. 1, the radio secure tag 120 supporting the secure mode and the normal mode is shown. The radio secure tag 120 may include a tag modem 121, a tag processing unit including a normal mode tag processing unit 122-1 and a secure mode tag processing unit 122-2, and a tag encryption module 123.

In response to an access request of the radio secure reader 110, the tag modem 121 may transmit, to the radio secure reader 110, an operation mode that is predetermined and is stored.

When the stored operation mode is the normal mode and the radio secure reader 110 performs the first inventory process based on the normal mode, the normal mode tag processing unit 122-1 enables the radio secure reader 110 and the radio secure tag 120 to communicate with each other with maintaining a minimum security. When a mutual authentication is requested from the radio secure reader 110 through the additional authentication processing process after the first inventory process is completed, the normal mode tag processing unit 122-1 may, in response thereto, authenticate the radio secure reader 110 and the radio secure tag 120. When the radio secure reader 110 is authenticated, the normal mode tag processing unit 122-1 may operate according to control of the authenticated radio secure reader 110. For example, according to the control of the radio secure reader 110, the normal mode tag processing unit 122-1 may change the stored operation mode and newly store the changed operation mode.

When the stored operation mode is the secure mode and the radio secure reader 110 performs the second inventory process including the mutual authentication process between the radio secure reader 110 and the radio secure tag 120 according to the secure mode, whereby the radio secure reader 110 is authenticated, the secure mode tag processing unit 122-2 may operate according to control of the authenticated radio secure reader 110.

Specifically, when the operation mode is the normal mode, the radio secure reader 110 may perform the first inventory process based on the normal mode and then perform the additional authentication processing process. Through this, the normal mode tag processing unit 122-1 may perform the mutual authentication processing according to the additional authentication processing process.

As the additional authentication processing process, the normal mode tag processing unit 122-1 may transmit the first CH_tag message to the radio secure reader 110, may receive, from the radio secure reader 110, the second CH_tag message in which the first CH_tag message is encrypted, and may compare the first CH_tag message with the second CH_tag message.

Here, the normal mode tag processing unit 122-1 may drive the tag encryption module 123 using the second secret key and decrypt the second CH_tag message received from the radio secure reader 110 and then, compare the first CH_tag message with the second CH_tag message.

When the operation mode is the secure mode and the radio secure reader 110 performs the second inventory process based on the secure mode, the secure mode tag processing unit 122-2 may perform the authentication processing process included in the second inventory process.

Specifically, when the Sec_ACK command is received from the radio secure reader 110 as the mutual authentication process between the radio secure reader 110 and the radio secure tag 120 that is included in the second inventory process, the secure mode tag processing unit 122-2 may initialize the tag encryption module 123 based on information associated with the security and may transmit information associated with the security to the radio secure reader 110.

Next, when the ACK command is received from the radio secure reader 110, the secure mode tag processing unit 122-2 may encrypt EPC information using the initialized tag encryption module 123 and may transmit the encrypted EPC information to the radio secure reader 110.

As the authentication processing process included in the second inventory process, when the operation mode is the secure mode, the secure mode tag processing unit 122-2 may transmit the first random number RN 16 to the radio secure reader 110 and receive, from the radio secure reader 110, the second random number in which the first random number is encrypted, and thereby compare the first random number with the second random number. Here, the secure mode tag processing unit 122-2 may drive the tag encryption module 123 using the second secret key to decrypt the second random number received from the radio secure reader 110 and then compare the first random number with the second random number.

When the command to maintain the normal mode or the command to shift from the secure mode to the normal mode is received from the radio secure reader 110, the normal mode tag processing unit 122-1 may operate in the normal mode. When the command to maintain the secure mode or the command to shift from the normal mode to the secure mode is received from the radio secure reader 110, the secure mode tag processing unit 122 may operate in the secure mode.

The tag encryption module 123 may be driven by the normal mode tag processing unit 122-1 or the secure mode tag processing unit 122-2 to encrypt a message, for example, a CH_tag message transmitted to the radio secure reader 110, or to decrypt a message received from the radio secure reader 110. Here, the tag encryption module 123 may be driven using the internally stored second secret key.

The tag encryption module 123 may be configured to be the same as the reader encryption module 113, and the second secret key may be the same as the first secret key used in the reader encryption module 113.

Hereinafter, a relationship between a radio secure tag and a radio secure reader will be described.

The radio secure tag may operate based on an ISO/IEC 18000-6 protocol in a normal mode, and may employ a data format of an eXtensible Protocol Control (XPC) used in the ISO/IEC 18000-6 protocol as a method for providing, to the radio secure reader, information regarding whether a secure function with respect to the radio secure tag is supported, and a current operation state.

The XPC may include 16 bits as a data format for providing, to the radio secure reader, a function supported by the radio secure tag, for example, a sensor and battery supporting function, and may include extra bits for future use.

The radio secure tag may indicate the current operation state and whether the secure function is supported using the extra bits included in the XPC. For example, the radio secure tag may use two bits among extra bits included in the XPC. The radio secure tag may indicate whether the secure function with respect to the radio secure tag is supported using a single secure tag (ST) bit, and may indicate whether EPC according to the XPC is normal or meaningless using another single void identifier (VI) bit. For example, the radio secure tag may indicate a normal tag as '0' and indicate a secure tag as '1', and may indicate normal EPC as '0' and indicate meaningless EPC as '1'.

Here, when the VI bit of the XPC received from the radio secure tag is '0', the radio secure reader may recognize that the normal EPC is received and the radio secure tag operates in the normal mode. When the VI bit of the XPC is '1', the radio secure reader may recognize that the radio secure tag operates in the secure mode. In this instance, when the radio secure tag does not support the secure function, the radio secure reader may ignore the VI bit of the XPC.

When the radio secure tag is set to the normal mode according to control of an authenticated secure reader, the radio secure tag may the radio secure tag may support the inventory process according to the ISO/IEC 18000-6 protocol and all the commands with both a secure reader supporting a secure function and a general reader not supporting the secure function, and may publish UII of the radio secure tag to the secure reader or the general reader.

Also, when the radio secure tag is set to the secure mode according to control of the authenticated secure reader, the radio secure tag may drive an encryption module that performs the secure function, using a secret key present within the radio secure tag and thereby, support an authentication protocol or a command to perform a tag authentication and reader authentication function.

Here, the tag authentication may be used for an authentic verification of the secure tag, and the reader authentication may be used to enable only the authenticated secure reader to write or correct a secret key or security related data within the secure tag.

To support the tag authentication at the general reader, the radio secure tag supporting the secure function and the authentication server may need to have the same encryption module and the same secret key. Here, the general reader may not include security related information and data, and may support only a predetermined command for a cognitive capability of the radio secure tag and authentication of the radio secure tag. In addition, the general reader may transmit, to the authentication server, a reply message with respect to the command to thereby receive the result regarding whether the authentication server is authentic.

Also, to support the reader authentication at the radio secure tag, the secure reader and the radio secure tag supporting the secure function may need to have the same encryption module and the same secret key.

Figure 2:
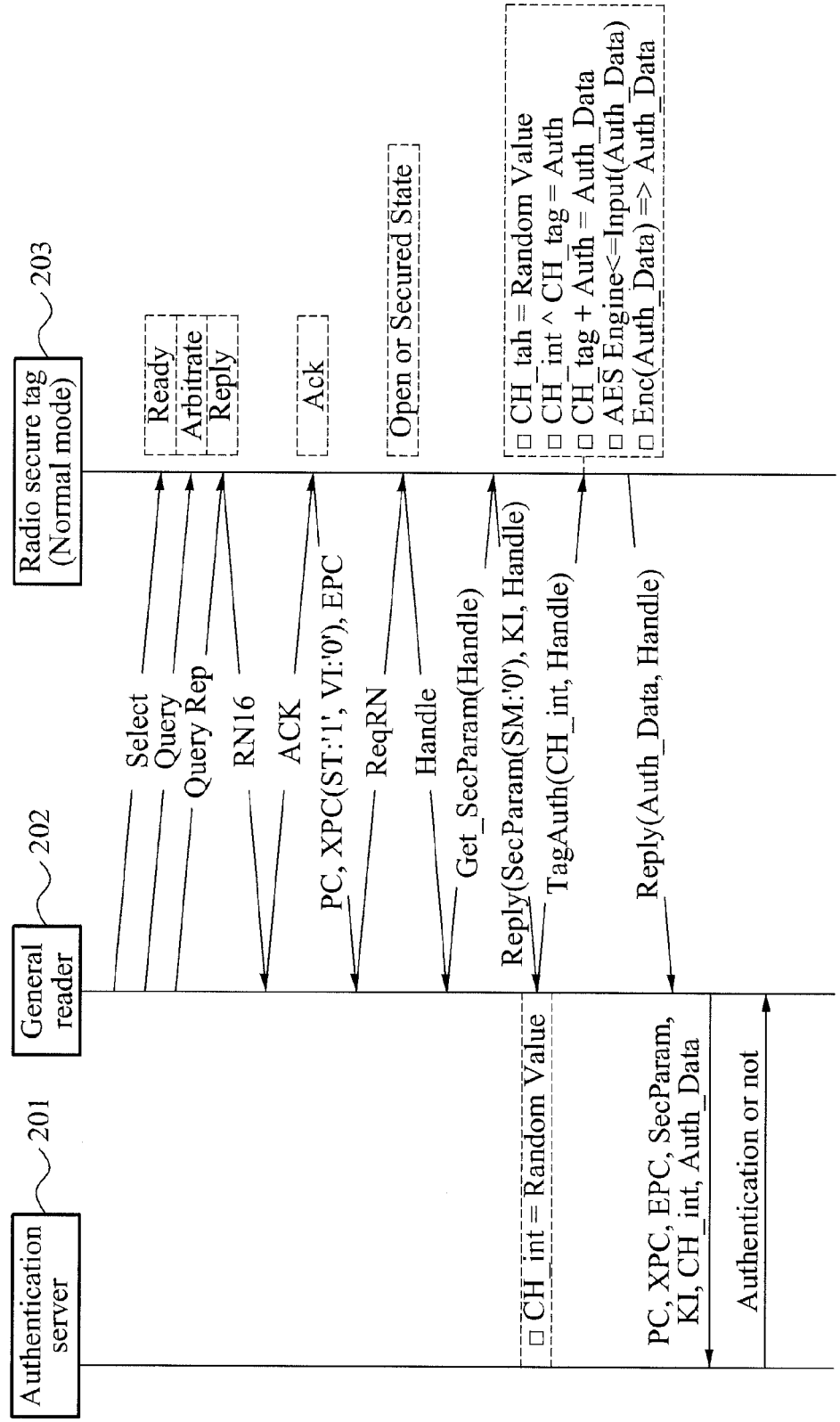
FIG. 2 is a diagram illustrating a tag authentication procedure among a radio secure tag operating in a normal mode, a general reader, and an authentication server according to an embodiment of the present invention.

FIG. 2 is a diagram illustrating a tag authentication procedure among a radio secure tag 203 operating in a normal mode, a general reader 202, and an authentication server 201 according to an embodiment of the present invention.

Referring to FIG. 2, the radio secure tag 203 operating in the normal mode may perform an inventory process according to an ISO/IEC 18000-6 protocol and all the commands with the general reader 202. The radio secure tag 203 operating in the normal mode may transmit PC, XPC, and EPC to the general reader 202 during the inventory process. In this instance, the radio secure tag 203 may transmit the XPC to the general reader 202 by setting, to '1', an ST bit and setting a VI bit to '0' within the XPC. Through this, the radio secure tag 203 may inform that the radio secure tag 203 corresponds to a secure tag and normal EPC corresponding to the normal mode is transmitted.

When the general reader 202 receives a Handle message from the radio secure tag 203 as a reply message to a ReqRN command, the general reader 202 may terminate the inventory process and transmit a Get SecParam command to the radio secure tag 203 in order to obtain secure information within the radio secure tag 203. When the radio secure tag 203 receives the Get SecParam command, the radio secure tag 203 may transmit, to the general reader 202, secure information, for example, SecParam and a key index KI.

The general reader 202 may generate a CH_int message and transmit, to the radio secure tag 203, a TagAuth command including the CH_int message. The radio secure tag 203 may generate a CH_tag command and generate an Auth message by performing exclusive OR operation with respect to the CH_tag message and the CH_int message received from the general reader 202. The radio secure tag 203 may generate Auth_Data by generating the CH_tag message and the Auth message using 128 bits, for example, by connecting two messages and then padding the connected messages to '0'. The radio secure tag 203 may encrypt the generated Auth_Data using an encryption module of the radio secure tag 203 and then transmit the encrypted Auth_Data to the general reader 202. The general reader 202 may transmit, to the authentication server 201 connected to a wired network or a wireless network, EPC information of the radio secure tag 203, the secure information, and encrypted data, for example, the PC, the XPC, the EPC, SecParam, the key index KI, CH_int, and encrypted Auth_Data, and may wait for receiving the result about whether the radio secure tag 203 is authenticated.

The authentication server 201 may obtain the CH_tag message and the Auth message by decrypting the encrypted Auth_Data based on the secure information transmitted from the general reader 202. The authentication server 201 may extract the CH_tag message by performing exclusive-OR operation with respect to the decrypted CH_int message and Auth message, and compare the extracted CH_tag message with the CH_tag message that is obtained by decrypting and the Auth_Data. Through this, the authentication server 201 may determine whether the radio secure tag 203 is a right tag. Specifically, when the extracted CH_tag message matches the obtained CH_tag message, the authentication server 203 may determine the radio secure tag 203 as the right tag. Conversely, when the extracted CH_tag message does not match the obtained CH_tag message, the authentication server 201 may determine the radio secure tag 203 is not the right tag and provide the determination result to the general reader 202.

Figure 3:
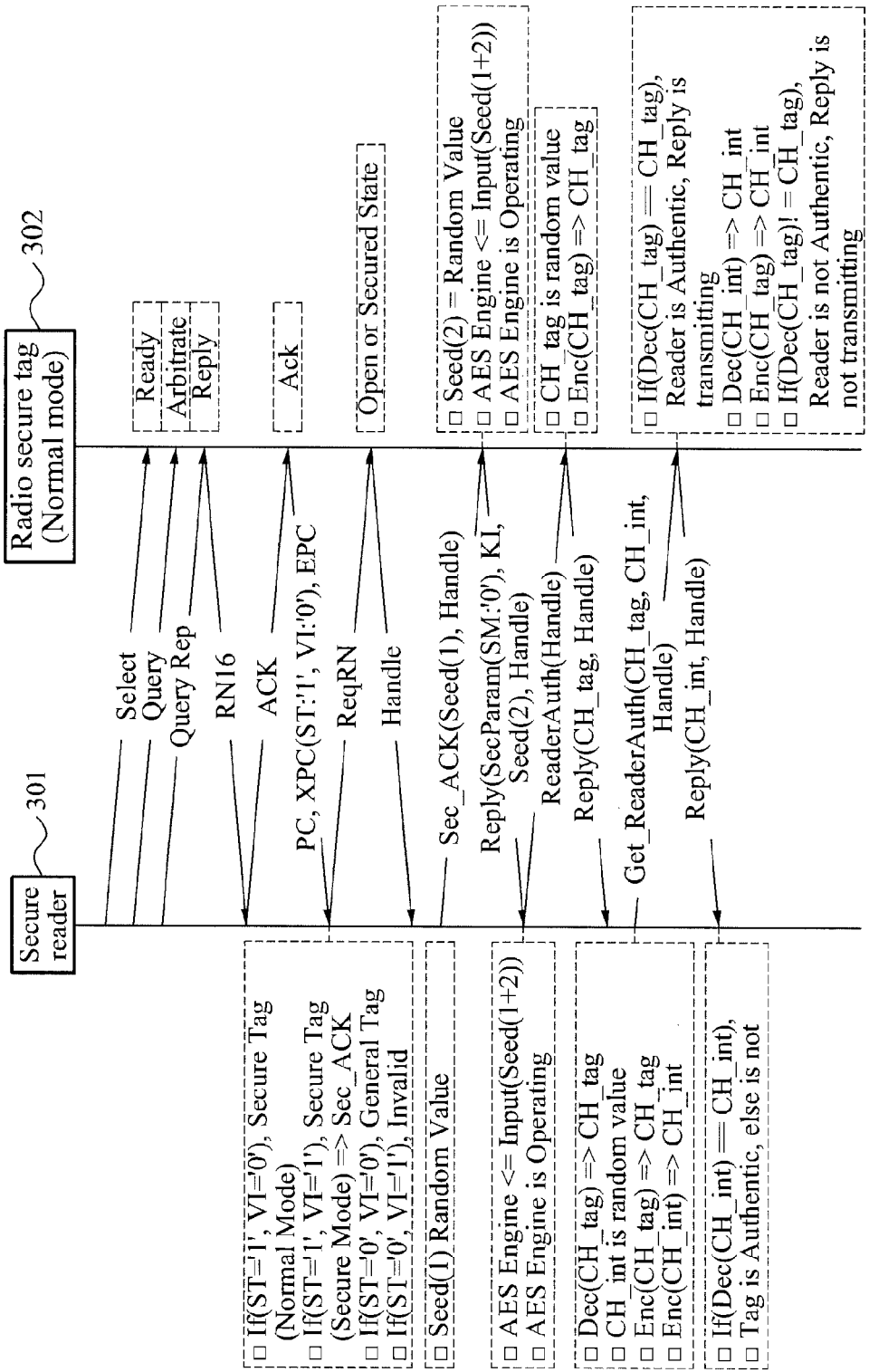
FIG. 3 is a diagram illustrating a mutual authentication procedure after an inventory process between a radio secure tag operating in a normal mode and a secure reader according to an embodiment of the present invention.

FIG. 3 is a diagram illustrating a mutual authentication procedure after an inventory process between a radio secure tag 302 operating in a normal mode and a secure reader 301 according to an embodiment of the present invention.

Referring to FIG. 3, the radio secure tag 302 operating in the normal mode may perform an inventory process according to an ISO/IEC 18000-6 protocol and all the commands with the secure reader 301. The radio secure tag 302 operating in the normal mode may transmit PC, XPC, and EPC to the secure reader 301 during the inventory process. In this instance, the radio secure tag 302 may transmit, to the secure reader 301, the XPC in which an ST bit is set to '1' and a VI bit is set to '0'. Accordingly, the radio secure tag 302 may inform that the radio secure tag 302 corresponds to a secure tag and normal EPC corresponding to the normal mode is transmitted.

When the secure reader 301 receives a Handle message from the radio secure tag 302 as a reply message to a ReqRN command, the secure reader 301 may terminate the inventory process and generate Seed(1) for initialization of an encryption module and transmit, to the radio secure tag 302, an Sec_ACK command including the generated Seed(1) for mutual authentication. In this instance, the radio secure tag 302 may transmit, to the secure reader 301, its secure information and arbitrarily generated Seed(2) and at the same time, initialize an encryption module of the radio secure tag 302 using Seed(1+2).

After initializing an encryption module of the secure reader 301 based on the secure information and Seed(1+2) received from the radio secure tag 302, the secure reader 301 may transmit a ReaderAuth command to the radio secure tag 302 and wait for a reader authentication reply from the radio secure tag 302. The radio secure tag 302 may encrypt the arbitrarily generated CH_tag message with the encryption module, and may transmit, to the secure reader 301, the encrypted CH_tag message as a reply message to the ReaderAuth command.

Using the encryption module, the secure reader 301 may decrypt the encrypted CH_tag message, re-encrypt the decrypted CH_tag message, generate a CH_int message, and encrypt the generated CH_int message. The secure reader 301 may transmit, to the radio secure tag 302, the re-encrypted CH_tag message and the encrypted CH_int message using a Get_ReaderAuth command.

The radio secure tag 302 may decrypt the CH_tag message and the CH_int message received from the secure reader 301, and may compare the decrypted CH_tag message with the CH_tag message arbitrarily generated by the radio secure tag 302. When the messages match each other, the radio secure tag 302 may re-encrypt the decrypted CH_int message and transmit the re-encrypted CH_int message to the secure reader 301 as a reply message to the Get_ReaderAuth command, thereby performing an authentication procedure with respect to the secure reader 301. When the messages do not match each other, the radio secure tag 302 may terminate the reader authentication procedure without transmitting the reply message to the secure reader 301.

When the secure reader 301 receives the re-encrypted CH_int message from the radio secure tag 302, the secure reader 301 may decrypt the re-encrypted CH_int message and compare the decrypted CH_int message with the CH_int message arbitrarily generated by the secure reader 301. Through this, the secure reader 301 may perform authentication of the radio secure tag 302, and may determine whether to correct secure information associated with the radio secure tag 302 based on the authentication result.

Figure 4:
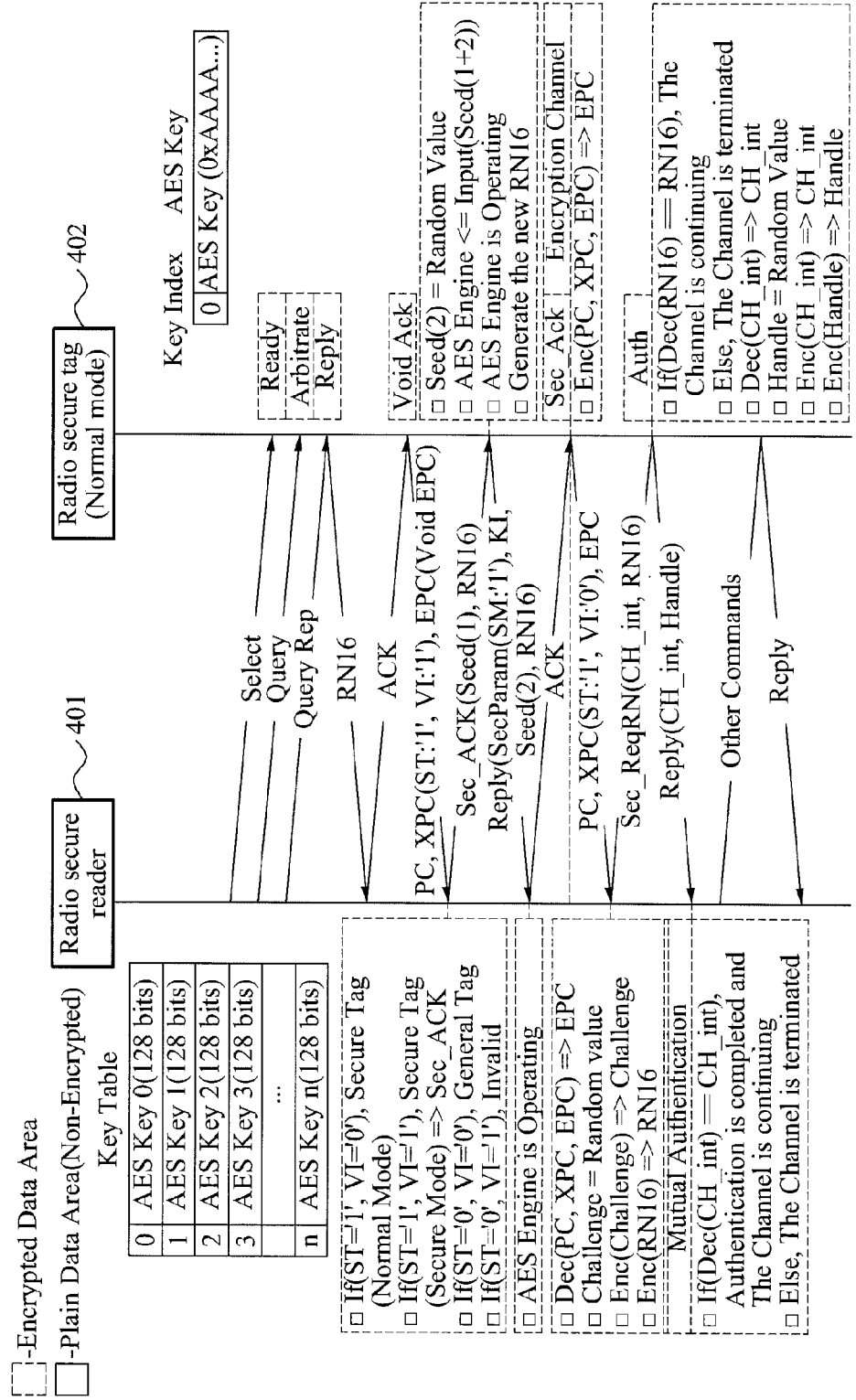
FIG. 4 is a diagram illustrating a secure inventory process including a mutual authentication procedure between a radio secure tag operating in a secure mode and a secure reader according to an embodiment of the present invention.

FIG. 4 is a diagram illustrating a secure inventory process including a mutual authentication procedure between a radio secure tag 402 operating in a secure mode and a secure reader 401 according to an embodiment of the present invention.

Referring to FIG. 4, when the radio secure tag 402 operates in the secure mode, only the secure reader 401 may perform an inventory process with the radio secure tag 402 according to a separate secure protocol. The secure protocol may include the mutual authentication procedure between the secure reader 401 and the radio secure tag 402 operating in the secure mode, and a process of transmitting and receiving encrypted data. In this instance, only the secure reader 401 having the same encryption module and the same secret key as the radio secure tag 402 may recognize normal EPC UII of the radio secure tag 402, and may perform data communication after the inventory process is completed.

In addition, when a general reader accesses the radio secure tag 402 set to the secure mode, the radio secure tag 402 may transmit, to the general reader, Void EPC UII observing an ISO/IEC 18000-6 protocol. Here, Void EPC may be used to prevent malfunction with the general reader and thereby maintain the compatibility by defining a tag identifier (ID) to a predetermined value and remainder to '0', or by defining a valid EPC value only while the radio secure tag 402 receives a continuous wave (CW).

The radio secure tag 402 operating in the secure mode may perform the inventory process according to the ISO/IEC 18000-6 protocol and all the commands with the secure reader 401.

The radio secure tag 402 operating in the secure mode may transmit, to the secure reader 401, PC, XPC, and Void EPC during the inventory process. In this instance, the radio secure tag 402 may transmit, to the secure reader 401, the XPC in which an ST bit is set to '1' and a VI bit is set to '1'. Through this, the radio secure tag 402 may inform that the radio secure tag 402 corresponds to a secure tag and operates in the secure mode since EPC corresponds to the Void EPC. When the general reader receives the Void EPC, the general reader may read Void EPC as a tag UII and recognize a ReqRN command as an end, thereby terminating the inventory process.

After receiving the PC, the XPC, and the Void EPC through the inventory process, the secure reader 401 may transmit a Sec_ACK command to the radio secure tag 402 in order to communicate with the radio secure tag 402 set to the secure mode. In response to the Sec_ACK command, the radio secure tag 402 may transmit secure information to the secure reader 401 and perform initialization of an encryption module included within the radio secure tag 402. The secure reader 401 may perform initialization of the encryption module based on the secure information received from the radio secure tag 402, and may transmit an ACK command to the radio secure tag 402.

In response to the ACK command, the radio secure tag 402 may encrypt the PC, the XPC, and EPC of the radio secure tag 402 using the initialized encryption module and transmit the encrypted PC, XPC, and EPC to the secure reader 401. The secure reader 401 may decrypt encrypted data using the encryption module and thereby restore original plain text and verify the EPC of the radio secure tag 402.

The secure reader 401 may perform the mutual authentication with the radio secure tag 402 using a Sec_ReqRN command. When the mutual authentication is completed, the radio secure tag 402 may terminate the inventory process by performing a state shift, or may perform another command according to the ISO/IEC 18000-6 protocol.

The secure reader 401 may encrypt an arbitrarily generated CH_int message and RN16 received from the radio secure tag 402, and may transmit, to the radio secure tag 402, the Sec_ReqRN command including the encrypted CH_int message and the RN16. The radio secure tag 402 may decrypt the CH_int message and RN 16 received from the secure reader 401. When the decrypted RN16 is normal, for example, when the decrypted RN16 matches RN16 generated by the radio secure tag 402, the radio secure tag 402 may transmit a reply message. Conversely, when the decrypted RN16 is abnormal, for example, when the decrypted RN16 does not match RN16 generated by the radio secure tag 402, the radio secure tag 402 may terminate the inventory process. When the RN16 is normal, the radio secure tag 402 may re-encrypt the decrypted CH_int message and encrypt an arbitrarily generated Handle message and then, transmit, to the secure reader 401, the re-encrypted CH_int message and the encrypted Handle message.

The secure reader 401 may decrypt the CH_int message and the Handle message received from the radio secure tag 402, and may compare the decrypted CH_int message with the CH_int message generated by the secure reader 401. When the messages match each other, the secure reader 401 may continuously perform the inventory process by authenticating the radio secure tag 402, and otherwise, the secure reader 401 may terminate the inventory process.

When the normal CH_int message is received, for example, when the decrypted CH_int message matches the CH_int message generated by the secure reader 401, the secure reader 401 may perform an encryption and decryption process with respect to subsequently used all the commands and reply data using the encryption module, and may communicate with the radio secure tag 402 only via an encryption channel.

FIG. 5 is a diagram illustrating a secure command format between a radio secure tag operating in a secure mode and a secure reader according to an embodiment of the present invention.

Referring to FIG. 5, a Sec_ReqRN command may include Command (0xE1XX), CH_int, RN16, and CRC16, and a Sec_ReqRN reply may include CH_int, Handle, and CRC16.

A TagAuth command may include Command (0xE1XX), CH_int, Handle, and CRC 16, and a TagAuth reply may include Header, Auth_Data, Handle, and CRC 16.

A ReaderAuth command may include Command (0xE1XX), Handle, and CRC16, and a ReaderAuth reply may include CH_tag, Handle, and CRC16.

A Get_ReaderAuth command may include Command (0xE1XX), CH_tag, CH_int, Handle, and CRC16, and a Get_ReaderAuth reply may include CH_int, Handle, and CRC16.

Figure 6:
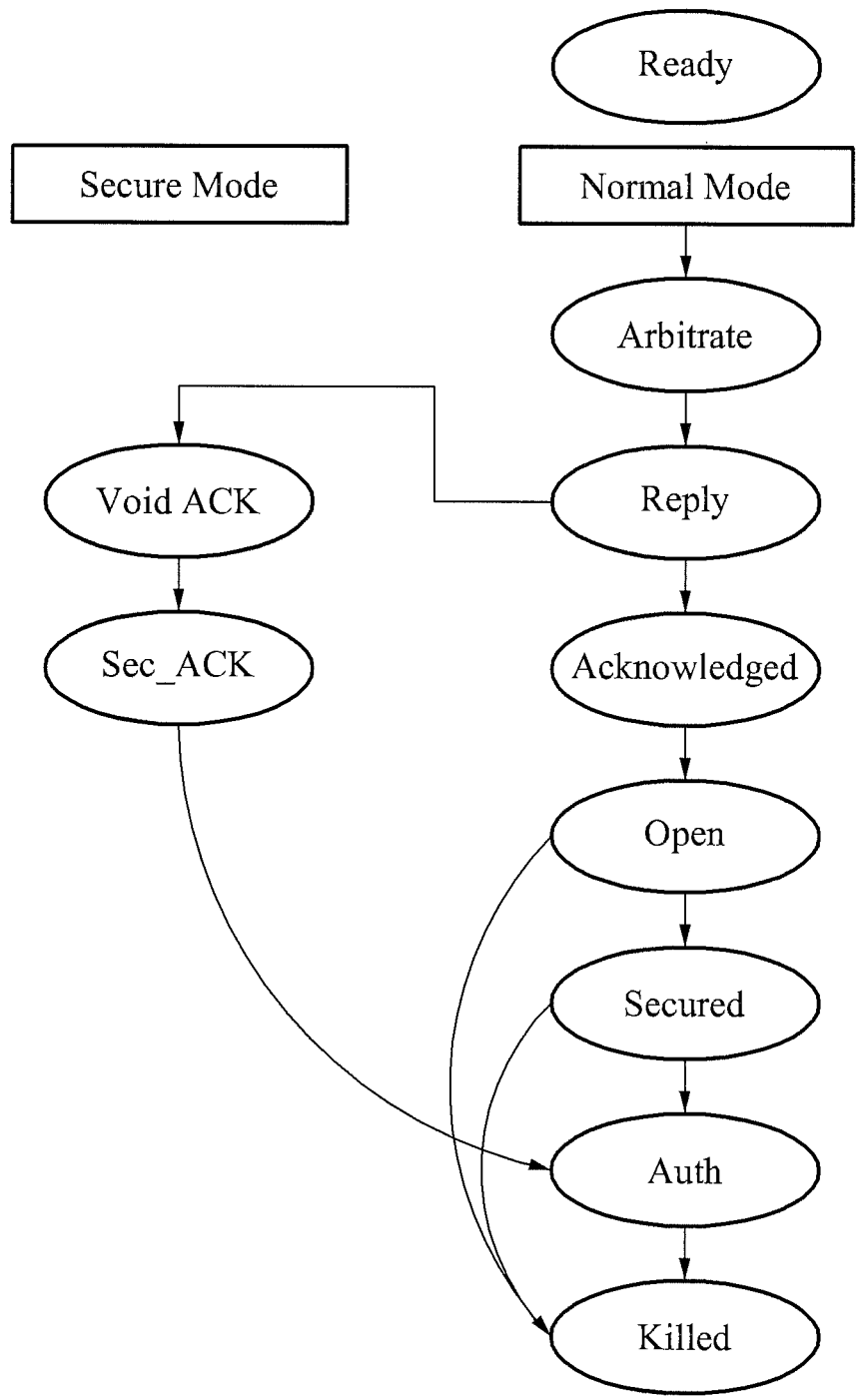
FIG. 6 is a diagram illustrating a change in a state of a radio secure tag for each mode according to an embodiment of the present invention.

FIG. 6 is a diagram illustrating a change in a state of a radio secure tag for each mode according to an embodiment of the present invention.

Referring to FIG. 6, the radio secure tag may be in a ready state according to control of a radio secure reader. In the ready state, the radio secure tag may not be killed and an energized tag not participating in a current inventory round may be indicated to be in a holding state.

When the radio secure reader receives a CW in a normal mode, the radio secure tag may become to be in an arbitrate state that is a coordination state. In the arbitrate state, a tag using a non-zero value with respect to a slot counter in order to participate in the current inventory round may be indicated to be in the holding state.

Next, the radio secure tag using the slot counter as a zero value according to progressing of the inventory round may operate in a reply state. When a reply is input into the radio secure tag in the reply state, RN16 may be transmitted to the radio secure reader. When the radio secure tag receives valid ACK, the radio secure tag may be switched to be in an acknowledged state. Conversely, when the radio secure tag does not receive ACK or receives invalid ACK, the radio secure tag may return to be in the arbitrate state.

When the radio secure tag is switched to be in the acknowledged state, the radio secure tag may be switched to be in any state excluding the killed state according to a received comment.

When a tag in the acknowledged state of which an access password is nonzero receives a Req_RN command, the tag may be shifted to an open state. In the open state, new RN16 may be transmitted to generate a subsequent command in a reader and a subsequent reply in the tag corresponding thereto.

On the other hand, when a tag in the acknowledge state of which the access password is zero receives the Req_RN command, the tag may be shifted to a secured state. In the secured state, new NR16 may be transmitted to generate the subsequent command in the reader and the subsequent reply in the tag corresponding thereto.

Next, in the open state or in the secured state, when the radio secure tag receives a Kill command, the radio secure tag may enter into the killed state.

In the secure mode, the radio secure tag may be shifted from the ready state to a Void ACK state and thereby provide an un-traceability function with respect to the radio secure tag or may reply invalid or random UII.

Next, in a Sec_ACK state, the radio secure tag may assign an identification right to an authenticated reader or may reply using encrypted UII.

Finally, the radio secure tag performing a mutual authentication process with the reader may be shifted to an Auth state and may perform communication using encrypted data in the Auth state.

Specifically, the radio secure tag may communicate with the radio secure reader through a procedure or a command identified for each operation mode.

According to embodiments of the present invention, it is possible to support compatibility with a radio secure reader supporting a secure function and a general radio secure reader not supporting the secure function by controlling a radio secure tag to operate in one of a secure mode and a normal mode, and by controlling an authenticated secure reader to change a mode of the radio secure tag as necessary.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

EXPLANATION OF REFERENCE NUMERALS

110: Radio secure reader controlling an operation mode of a radio secure tag
111: Reader modem                  112: Reader processing unit
113: Reader encryption module      114: Toggle mode command unit
120: Radio secure tag supporting secure mode & normal mode
121: Tag modem
122-1, 122-2: Normal mode/secure mode tag processing unit
123: Tag encryption module

The invention claimed is:

1. A radio secure reader for controlling an operation mode of a radio secure tag, comprising:
a reader modem to receive the operation mode from the radio secure tag; and
a reader processing unit to identify the received operation mode as a normal mode or a secure mode, and to control the radio secure tag based on the identified operation mode, wherein the control comprises of operating the radio secure tag only in a single mode, either the secure mode or the normal mode, using a toggle mode command unit, and wherein
when the operation mode is identified as the normal mode, the reader processing unit performs a first inventory process and performs authentication processing with respect to the radio secure tag, and when the authentication processing is completed, the reader processing unit is allowed to control the radio secure tag, and
when the operation mode is identified as the secure mode, the reader processing unit performs a second inventory process including authentication processing with respect to the radio secure tag and then, is allowed to control the radio secure tag.

2. The radio secure reader of claim 1, wherein: as the authentication processing, the reader processing unit receives a first challenge_tag message from the radio secure tag and transmits, to the radio secure tag, a first challenge_int message together with a second challenge_tag message in which the first challenge_tag message is encrypted, and
the reader processing unit receives, from the radio secure tag, a second challenge_int message associated with the first challenge_int message and authenticates the radio secure tag when the first challenge_int message matches the second challenge_int message as a comparison result.

3. The radio secure reader of claim 1, wherein: as the authentication processing included in the second inventory process, the reader processing unit receives a first random number from the radio secure tag and transmits, to the radio secure tag, a first challenge_int message together with a second random number in which the first random number is encrypted, and
the reader processing unit receives, from the radio secure tag, a second challenge_int message associated with the first challenge_int message and authenticates the radio secure tag when the first challenge_int message matches the second challenge_int message as a comparison result.

4. The radio secure reader of claim 1, wherein when the radio secure tag is shifted to an authenticated sate, the reader processing unit maintains or changes the operation mode of the radio secure tag, or controls data stored in the radio secure tag to be changed.

5. The radio secure reader of claim 1, further comprising: a toggle mode command unit to determine the operation mode, and to set the determined operation mode to be set in the radio secure tag through the reader modem.

6. A radio secure tag for supporting a secure mode and a normal mode, comprising:
a tag modem to transmit a predetermined operation mode to a radio secure reader in response to an access request from the radio secure reader; and
a tag processing unit to perform authentication processing according to processing in the radio secure reader based on the operation mode, and to operate according to control of the authenticated radio secure reader when the radio secure reader is authenticated, wherein the control comprises of operating the radio secure tag only in a single mode, either the secure mode or the normal mode, using a toggle mode command unit, and wherein:
the tag processing unit comprises a normal mode tag processing unit,
when the predetermined operation mode corresponds to the normal mode, the normal mode tag processing unit performs a first inventory process and then, as the authentication processing, transmits a first challenge_tag message to the radio secure reader and receives, from the radio secure reader, a second challenge_tag message in which the first challenge_tag message is encrypted and compares the first challenge_tag message with the second challenge_tag message, and
the tag processing unit comprises a secure mode tag processing unit,
when the predetermined operation mode corresponds to the secure mode, the secure mode tag processing unit performs a second inventory process and then, as the authentication processing, transmits a first random number to the radio secure reader and receives, from the radio secure reader, a second random number in which the first random number is encrypted and compares the first random number with the second random number.

* * * * *